UNITED STATES PATENT OFFICE 2,302,749

DITHIOCARBAMATES

Russell T. Dean, Stamford, Conn., assignor to American Cyanamid Company, New York, N. Y., a corporation of Maine No Drawing. Application December 31, 1941, Serial No. 425,235

7 Claims. (Cl. 260—501)

This invention relates to a class of new chemical compounds and more particularly to derivatives of dithiocarbamic acid.

The dithiocarbamates of the invention are characterized by the presence of substituent ether groups on alkyl radicals attached to the nitrogen atom of the dithiocarbamic acid molecule. The compounds may be represented by the formula

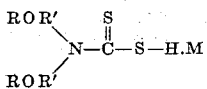

wherein R may be an alkyl, aralkyl or aryl group which may be the same or different. The alkyl group may be acyclic or cyclic. These radicals may contain substituents which do not change the essential character of the compound such as halogen atoms, nitro groups, hydroxy groups, etc. R' is an alkylene group which separates the oxygen atom from the nitrogen atom by at least two carbon atoms. This group may contain substituents of the kind described above in respect to the groups represented by R as well as aryl and substituted aryl radicals. R' may represent like or unlike alkylene radicals. M is an organic nitrogen base which may be a primary, secondary or tertiary alkyl, aralkyl, aryl or heterocyclic amine or a heterocyclic nitrogen base.

The dithiocarbamic acid derivatives of the invention may be prepared by methods known to the art for the preparation of similar derivatives of similar dithiocarbamic acids. The various dithiocarbamic acids may be prepared in the form of their sodium salts by reaction of carbon disulfide, a secondary amine and sodium hydroxide, in the presence of a suitable solvent. The resulting sodium salt in solution in the solvent is then subjected to a double decomposition reaction by adding thereto a salt of the desired organic nitrogen base (e. g. the hydrochloride). As will be understood by those skilled in the art, the solvent should preferably be so selected that it is a solvent for only one of the reaction products, thus providing for selective separation of the same. The addition is accompanied with good stirring of the reaction mixture. The insoluble sodium salt, e. g., sodium chloride, is filtered off and the filtrate containing the desired organic nitrogen base salt of the dithiocarbamic acid is concentrated under reduced pressure and dried in vacuo.

The secondary amines which may be employed for the preparation of the dithiocarbamates of the present invention have the formula

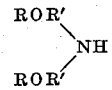

wherein R and R' are as in the above described general formula. Among the secondary amines may be mentioned, for example, Bis (2-methoxy ethyl) amine
Bis (2-ethoxy n-butyl) amine
Bis (2-ethoxy n-amyl) amine
Bis (2-ethoxy n-hexyl) amine
Bis (2-ethoxy 3-methylamyl) amine
Bis (2-ethoxy 2-benzylethyl) amine
Bis (2-ethoxy 2-phenylethyl) amine
Bis (2-phenoxy ethyl) amine
Bis (2-(β-naphthoxy) ethyl) amine Bis (2-p-methylphenoxy ethyl) amine
Bis (3-methoxy n-propyl) amine
Bis (3-ethoxy n-propyl) amine
Bis (3-isopropoxy n-propyl) amine
Bis (3-(2'-ethyl hexoxy) n-propyl) amine Bis (3-octadecoxy n-propyl) amine
Bis (3-phenoxy n-propyl) amine
Bis (3-cyclohexoxy n-propyl) amine
Bis (4-phenoxy n-butyl) amine Bis (3-(2'-ethoxy ethoxy) n-propyl) amine Bis (3-(2' ethyl hexoxy) isobutyl) amine The invention is further illustrated by the following specific examples to which, however, it is not intended that the invention be restricted.

Example 1

A solution in alcohol of the sodium salt of the desired dithiocarbamic acid is prepared, for example, by the slow addition with stirring of 16 g. of 50% sodium hydroxide (0.2 mol) to a cooled mixture of 38 g. of bis (3-ethoxy propyl) amine (0.2 mol), 200 cc. of ethyl alcohol and 15 g. of carbon disulfide (0.2 mol). After 15 minutes, an ethyl alcohol solution of an equimolecular proportion of one of the organic nitrogen bases in the form of a soluble salt, e. g. the hydrochloride, is added to the alcohol solution of the sodium salt, the addition being accompanied by good stirring. After an additional 15 minutes, the insoluble sodium salt, e. g. the chloride, is removed by filtration. The filtrate containing the organic nitrogen base salt of the dithiocarbamic acid is evaporated under reduced pressure at a temperature below 50° C. and the resulting concentrate desiccated in a vacuum over concentrated sulfuric acid.

Any of the various organic nitrogen bases can be employed in a similar manner for the preparation of salts falling within the scope of the invention among which may be mentioned, for example,

| | |
|---|---|
| Methyl amine | N-ethyl aniline |
| Dimethyl amine | N-cyclohexyl aniline |
| Trimethyl amine | Toluidine |
| Dibutyl amine | Pyridine |
| Cyclohexyl amine | Pyperidine |
| Dicyclohexyl amine | Ditetrahydrofurfuryl amine |
| Ethanolamine | |
| Diethanolamine | Morpholine |
| Aniline | |

The parent secondary amine salts of the dithiocarbamic acids are preferably prepared by reaction between one mol of carbon disulfide and two mols of the secondary amine, water or other suitable solvent being employed in the reaction.

*Example 2*

84 grams of bis (3-ethoxy propyl) amine are dissolved in 100 cc. of water and cooled to 5° C. 17 g. of carbon disulfide are added and the mixture well-stirred until clear, the temperature of the reaction mixture being kept below 25° C. The filtered product is a 50% solution of bis (3-ethoxy propyl) amine salt of bis (3-ethoxy propyl) dithiocarbamic acid which may be concentrated under reduced pressure and dried in vacuo over concentrated sulfuric acid to give the anhydrous salt which is an orange balsam.

In general, the compounds of the invention have good solubility in rubber and are accelerators of the vulcanization of rubber. For the most part, they are accelerators of the ultra type and therefore more suitable for the vulcanization of latex.

While I have described certain specific embodiments of my invention, it is to be understood that the invention is not to be limited thereto but is to be restricted solely by the scope of the appended claims construed as broadly as is permissible in view of the prior art.

I claim:
1. A dithiocarbamic acid derivative having the formula

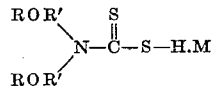

wherein R is a radical selected from the group consisting of alkyl, aralkyl, and aryl radicals, R' is an alkylene radical which separates the oxygen atom from the nitrogen atom by at least two carbon atoms, and M is an organic nitrogen base.

2. A dithiocarbamic acid derivative having the formula

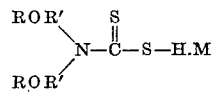

wherein R is a radical selected from the group consisting of alkyl, aralkyl, and aryl radicals, R' is an alkylene radical which separates the oxygen atom from the nitrogen atom by at least two carbon atoms, and M is an amine.

3. A dithiocarbamic acid derivative having the formula

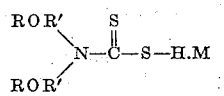

wherein R is an alkyl radical, R' is an alkylene radical which separates the oxygen atom from the nitrogen atom by at least two carbon atoms, and M is an amine.

4. A dithiocarbamic acid derivative having the formula

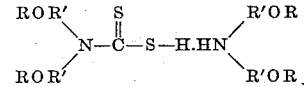

wherein R is a radical selected from the group consisting of alkyl, aralkyl, and aryl radicals and R' is an alkylene radical which separates the oxygen atom from the nitrogen atom by at least two carbon atoms.

5. Bis (2-methoxy ethyl) amine salt of bis (2-methoxy ethyl) dithiocarbamic acid.

6. Bis (3-methoxy propyl) amine salt of bis (3-methoxy propyl) dithiocarbamic acid.

7. Bis (3-ethoxy propyl) amine salt of bis (3-ethoxy propyl) dithiocarbamic acid.

RUSSELL T. DEAN.